(12) United States Patent
Ito

(10) Patent No.: US 6,873,351 B2
(45) Date of Patent: Mar. 29, 2005

(54) SYSTEM FOR AND METHOD OF SHARING PHOTOSENSITIVE MEDIUM CHARACTERISTICS, AND IMAGE FORMING APPARATUS

(75) Inventor: Tomohiko Ito, Odawara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 22 days.

(21) Appl. No.: 10/396,413

(22) Filed: Mar. 26, 2003

(65) Prior Publication Data
US 2003/0184610 A1 Oct. 2, 2003

(30) Foreign Application Priority Data

Mar. 28, 2002 (JP) ........................ 2002-093043
Mar. 6, 2003 (JP) ........................ 2003-060556

(51) Int. Cl.[7] .................. B41J 2/435; G06K 1/00
(52) U.S. Cl. ........................ 347/264; 358/1.9
(58) Field of Search .................. 347/19, 262, 264, 347/228, 240, 251; 358/1.9, 1.15, 2.1

(56) References Cited

U.S. PATENT DOCUMENTS

2002/0008756 A1 * 1/2002 Hirooka et al. ............ 347/246
2003/0117639 A1 * 6/2003 Milton et al. ............ 358/1.13

FOREIGN PATENT DOCUMENTS

JP        2000-292898        10/2000

* cited by examiner

Primary Examiner—Hai Pham
(74) Attorney, Agent, or Firm—Sughrue Mion, PLLC

(57) ABSTRACT

In a medical facility, image forming apparatus are connected to a local area network, and the characteristics of the photosensitive mediums are stored in a database connected to the local area network. When new photosensitive mediums are loaded in a certain image forming apparatus, attribute information of the new photosensitive mediums is transmitted to the database via the local area network. If the characteristics of the photosensitive mediums depending on the attribute information are stored in the database, then the characteristics of the photosensitive mediums are downloaded from the database via the local area network into the certain image forming apparatus. The characteristics of the photosensitive mediums can thus be shared among the image forming apparatus.

14 Claims, 9 Drawing Sheets

SYSTEM FOR AND METHOD OF SHARING PHOTOSENSITIVE MEDIUM CHARACTERISTICS, AND IMAGE FORMING APPARATUS

BACKGROUND OF THE INVENTION

1. Field of the Invention

The present invention relates to a system for and a method of sharing photosensitive medium characteristics, which are suitable for use in an image forming apparatus for forming an image by exposing a photosensitive medium and developing the image thereon under image forming conditions depending on the density characteristics of the photosensitive medium, and an image forming apparatus.

2. Description of the Related Art

Photosensitive mediums, e.g., photosensitive thermal-development recording mediums which are exposed to image light to form a latent image thereon and then heated to develop the latent image into a visible image, can be handled with ease as they are processed by a dry development system, rather than a wet development system. However, those photosensitive mediums suffer characteristic variations from production lot to production lot.

In order to form images of good quality on photosensitive thermal-development recording mediums, it is necessary to keep information as to the characteristics of those photosensitive mediums of the respective production lots and expose the photosensitive mediums to image light and develop images thereon under image forming conditions depending on the density characteristics of the photosensitive mediums.

The image forming conditions for photosensitive thermal-development recording mediums include exposure conditions for determining an amount of light to be applied to form a latent image and developing conditions for determining the temperature of a heat source used for thermal development and a period of time in which to develop the latent image.

Photosensitive thermal-development recording mediums are suitable for use as image recording films for medical diagnosis. Therefore, image forming apparatus which employ photosensitive thermal-development recording mediums are typically incorporated in medical facilities.

When such an image forming apparatus is shipped from the factory or installed in a medical facility, image processing conditions depending on the characteristics of photosensitive mediums of a given production lot, i.e., standard image processing conditions, are determined, and the standard image processing conditions are stored in a memory of the image forming apparatus for use in an image forming process.

When all photosensitive mediums included in an image forming apparatus in a medical facility are consumed, new photosensitive mediums are loaded into the image forming apparatus. For the purpose of achieving a desired level of image quality, it is important that the characteristics of the newly loaded photosensitive mediums be the same as the characteristics of the previously loaded photosensitive mediums.

Heretofore, the following process has been carried out to achieve the desired image quality: When new photosensitive mediums, i.e., a package of new photosensitive mediums, are loaded into the image forming apparatus, one of the newly loaded photosensitive mediums is exposed to image light under the standard image forming conditions to form a latent image thereon, the latent image is developed into a visible test pattern image, and the density characteristics of the test pattern image are measured by a densitometer. Then, the characteristics of the newly loaded photosensitive mediums, e.g., corrective conditions for the standard image forming conditions, are determined from the measured density characteristics. See Japanese laid-open patent publication No. 2000-292898 for details.

When a new photosensitive medium is to be exposed to image light to form a latent image thereon and the latent image is to be developed into a visible image, the standard image forming conditions are changed to image forming conditions depending on the determined characteristics of the photosensitive medium, and an image of constant image quality is formed under the changed image forming conditions.

However, since each time new photosensitive mediums are loaded into the image forming apparatus, it is necessary to measure characteristics of the newly loaded photosensitive mediums, the image forming apparatus needs a certain preparatory time before the new photosensitive mediums can be used in the image forming apparatus.

In addition, because the image forming apparatus consumes one of the newly loaded photosensitive mediums to output a test pattern image for measuring their characteristics, an extra cost is spent on the image forming apparatus from the trial print.

A solution to some of the above problems is also disclosed in Japanese laid-open patent publication No. 2000-292898.

The disclosed solution is based on the fact that a plurality of photosensitive mediums are stacked together in a light-shielded state and accommodated in a single package. Specifically, a bar code representing information as to the density characteristics of the packaged photosensitive mediums is applied to the package.

The image forming apparatus has a tray for loading the packaged photosensitive mediums into the image forming apparatus, a mechanism for removing the package from the photosensitive mediums on the tray in the image forming apparatus, and a bar-code reader for reading the bar code on the package.

When the packaged photosensitive mediums are loaded into the image forming apparatus, the bar-code reader reads the bar code on the package, and the characteristics of the newly loaded photosensitive mediums as represented by the bar code are stored in a memory in the image forming apparatus.

Generally, however, a bar code applied to a product records only attribute information such as the production date of the product, the manufacturer of the product, the production lot number, the name of the product, and the code of the product. It is usually difficult for the bar code to record corrective information for image forming conditions as described above, i.e., all the characteristics of photosensitive mediums.

If photosensitive mediums that are handled are photosensitive thermal-development recording mediums, then the corrective information referred above contains a large amount of data. A bar-code system which handles a large amount of data is highly expensive to manufacture.

According to Japanese laid-open patent publication No. 2000-292898, as described above, when a package of new photosensitive mediums is loaded into the tray of the image forming apparatus, one of the loaded photosensitive mediums is exposed to image light to form a latent image thereon, the latent image is thermally developed into a visible test pattern image, the density characteristics of the test pattern image are measured by a densitometer, and the measured density characteristics are stored as the characteristics of the loaded photosensitive mediums. Therefore, each time a package of new photosensitive mediums is loaded into the tray, one of the loaded photosensitive mediums is exposed to image light to form a latent image thereon, the latent image is thermally developed into a visible test pattern image, and the density characteristics of the test pattern image are measured by a densitometer. One of the loaded photosensitive mediums is thus consumed for a trial print, and the image forming apparatus needs a long preparatory time until the characteristics of the loaded photosensitive mediums are obtained. These disadvantages are not resolved in the conventional technique.

SUMMARY OF THE INVENTION

It is therefore an object of the present invention to provide a system for and a method of sharing photosensitive medium characteristics and an image forming apparatus, which minimize the number of photosensitive mediums to be consumed for a trial print, minimizes a preparatory time required until an image is formed when photosensitive mediums are newly loaded into the image forming apparatus, and allow characteristics of loaded photosensitive mediums to be acquired easily even if the amount of data representing the characteristics of loaded photosensitive mediums is large.

A system for sharing the characteristics of photosensitive mediums among a plurality of image forming apparatus connected to a local area network has a characteristics storage and retrieval apparatus connected to the local area network for storing the density characteristics of the photosensitive mediums in association with attribute information of the photosensitive mediums. When a certain image forming apparatus is loaded with new photosensitive mediums, attribute information of the newly loaded photosensitive mediums is transmitted to the characteristics storage and retrieval apparatus. If the characteristics storage and retrieval apparatus stores density characteristics of the photosensitive mediums corresponding to the transmitted attribute information, then the stored characteristics of the photosensitive mediums are downloaded via the local area network into the certain image forming apparatus. Thus, the density characteristics of the photosensitive mediums can be shared among the image forming apparatus.

With the above arrangement, if the density characteristics of new photosensitive mediums are stored in advance in the characteristics storage and retrieval apparatus, then there is no need for a photosensitive medium to be consumed for a trial print. As the density measuring unit is then not required to measure density characteristics, a preparatory time which is required for the image forming apparatus to be able to form images when new photosensitive mediums are loaded in the image forming apparatus is minimized. Even if the amount of data of the characteristics of photosensitive mediums is large, because the data are not read from a bar code, but downloaded from the characteristics storage and retrieval apparatus, the large characteristic data of the photosensitive mediums can be obtained with ease.

When an image forming apparatus is loaded with new photosensitive mediums, if attribute information of the new photosensitive mediums is not stored in the characteristics storage and retrieval apparatus, then the image forming apparatus generates a test pattern image under standard image forming conditions and measures density characteristics of the test pattern image. The image forming apparatus transmits the measured density characteristics to the characteristics storage and retrieval apparatus. The characteristics storage and retrieval apparatus stores the transmitted density characteristics in association with the new attribute information of the new photosensitive mediums. When another image forming apparatus is loaded with photosensitive mediums having the new attribute information, therefore, the density characteristics of the new photosensitive mediums can be used.

If each of the image forming apparatus comprises a plurality of loaders, then the characteristics storage and retrieval apparatus has a loader-associated attribute information storage unit for storing the attribute information of the photosensitive mediums presently loaded in the loaders in association with the loaders. Even when either one of the loaders in one of the image forming apparatus connected to the local area network is loaded with photosensitive mediums having different attribute information, each of the image forming apparatus can reliably use the characteristics of photosensitive mediums that are suitable for the attribute information of the photosensitive mediums loaded in the loader.

Preferably, the plurality of image forming apparatus, the characteristics storage and retrieval apparatus, and the local area network should be installed in a single medical facility.

The characteristics storage and retrieval apparatus may be incorporated in one of the image forming apparatus.

With the image forming apparatus according to the present invention, when one of the loaders is newly loaded with photosensitive mediums, if attribute information of the newly loaded photosensitive mediums which is read by an attribute information reader is stored in an attribute information storage unit, then a controller controls a density measuring unit not to measure density characteristics of the photosensitive mediums, but controls an image forming assembly to produce an image using density characteristics stored in a photosensitive medium characteristic storage unit. Therefore, the density characteristics can be shared in the image forming apparatus having the plural loaders. When photosensitive mediums having the same attribute information are loaded in another loader, no trial print is required, and no density characteristics need to be measured.

Actually, if the production lot numbers of the emulsions applied to the support sheets of photosensitive mediums, which are represented by the attribute information of the photosensitive mediums, are the same, then even when the photosensitive mediums have different sizes or accommodated in different packages, desired images can be produced on the photosensitive mediums under image forming conditions corresponding the same density characteristics.

If the attribute information of the newly loaded photosensitive mediums is new attribute information not stored in the attribute information storage unit, then the controller supplies one of the newly loaded photosensitive mediums to the image forming assembly, and the image forming assembly exposes the supplied photosensitive medium to test pattern image light to form a latent image thereon and develops the latent image into a visible test pattern image under standard image forming conditions. The density measuring unit measures density characteristics of the test pattern image, and the controller stores the measured density characteristics in the photosensitive medium characteristics storage unit, and updates data stored in the attribute information storage unit, a loader-associated attribute information storage unit, and an attribute information/photosensitive medium characteristic association table. When a loader is loaded with photosensitive mediums having the same attribute information, no trial print is required, and no density characteristics need to be measured.

A method of sharing the characteristics of photosensitive mediums according to the present invention allows the density characteristics of photosensitive mediums depending on the attribute information thereof to be shared among a plurality of image forming apparatus connected to a local area network. Therefore, the number of any photosensitive mediums to be consumed for a trial print is minimized, and the preparatory time which is required for the image forming apparatus to be able to form images when new photosensitive mediums are loaded in the image forming apparatus is minimized. In addition, the characteristics of the photosensitive mediums can be acquired with ease even if the amount of data of the density characteristics of the photosensitive mediums is large.

Furthermore, with the method of sharing the characteristics of photosensitive mediums according to the present invention, when the database in an image forming apparatus connected to a local area network is updated, the databases in the remaining other image forming apparatus connected to the local area network are automatically updated into latest information. Consequently, even if one of the image forming apparatus suffers a failure, since the databases in the other image forming apparatus can be used, the entire system is highly reliable in operation.

Preferably, the local area network should be installed in a single medical facility.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
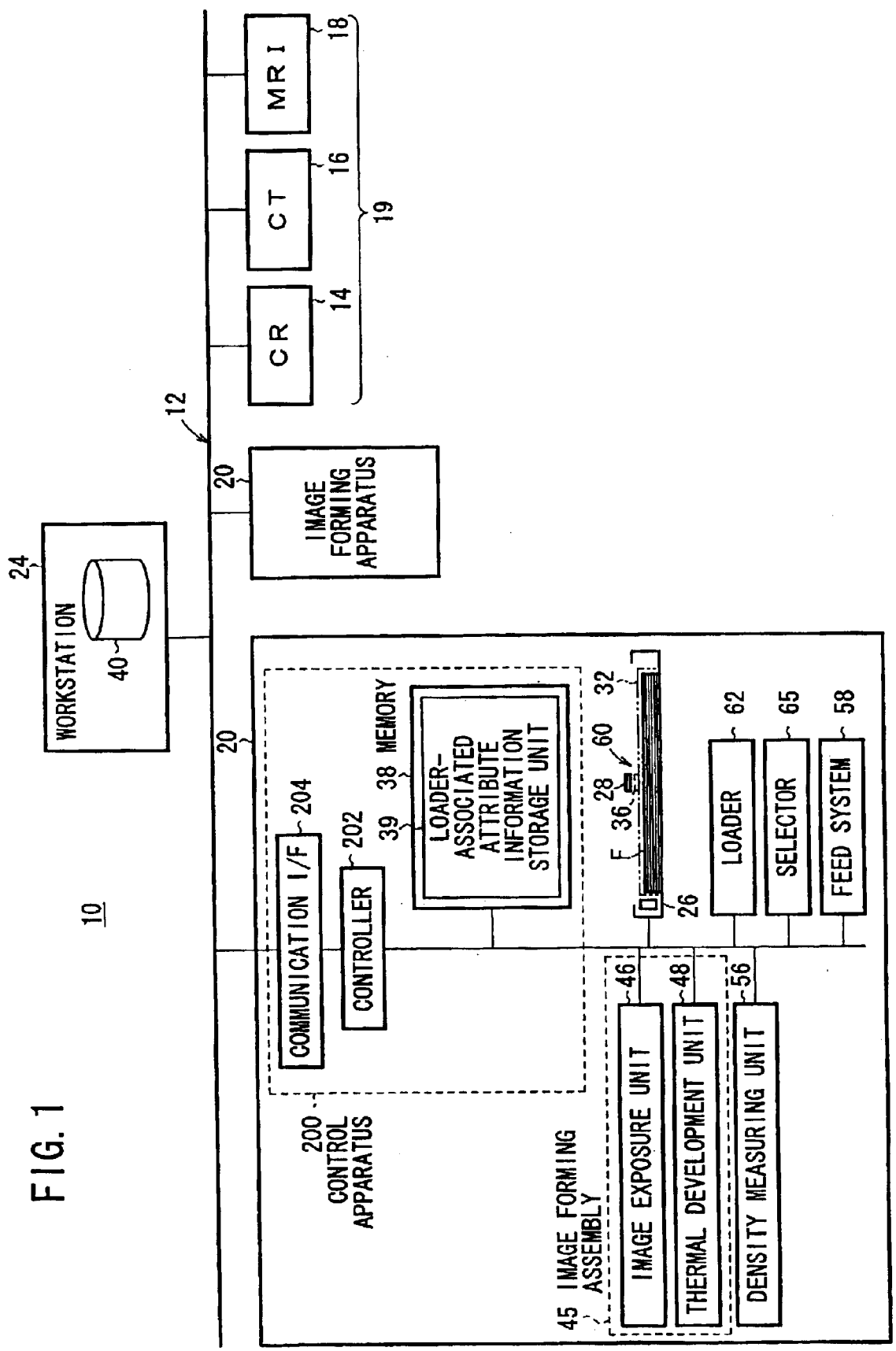
FIG. 1 is a block diagram of a medical imaging system according to an embodiment of the present invention.

FIG. 1 shows in block form a medical imaging system 10 which can incorporate a system for photosensitive medium characteristics according to an embodiment of the present invention.

The medical imaging system 10 is constructed in a medical facility in a hospital or a clinic.

Specifically, the medical imaging system 10 is constructed on a local area network 12 such as an intranet which uses group ware.

To the local area network 12, there are connected a CR (Computed Radiography) apparatus 14, an X-ray CT (Computerized Tomography) apparatus 16, and an MRI (Magnetic Resonance Imaging) apparatus 18 which serve as medical imaging apparatus 19, and also a plurality of image forming apparatus 20 each acting as a printer for producing an image of a subject captured by any of the medical imaging apparatus 19 as a visible image on a photosensitive medium such as a photographic film or the like.

A workstation 24 which is shared by the medical imaging apparatus 19 and the image forming apparatus 20 and serves as a characteristics storage and retrieval apparatus doubling as a host computer and a server is also connected to the local area network 12. The workstation 24 has a database 40 shared in the local area network 12.

Each of the image forming apparatus 20 has a plurality of loaders 60, 62 for being loaded with a package of photosensitive mediums F. In the present embodiment, each of the image forming apparatus 20 has two loaders, i.e., an upper loader 60 and a lower loader 62. The sets of the photosensitive mediums F loaded in the respective loaders 60, 62 may have different characteristics and different sizes.

Each of the photosensitive mediums F is a photosensitive thermal-development recording medium comprising a support sheet such as a transparent PET (PolyEthylene Terephthalate) film or the like and a photosensitive thermal-development image forming layer disposed on the support sheet.

Figure 2:
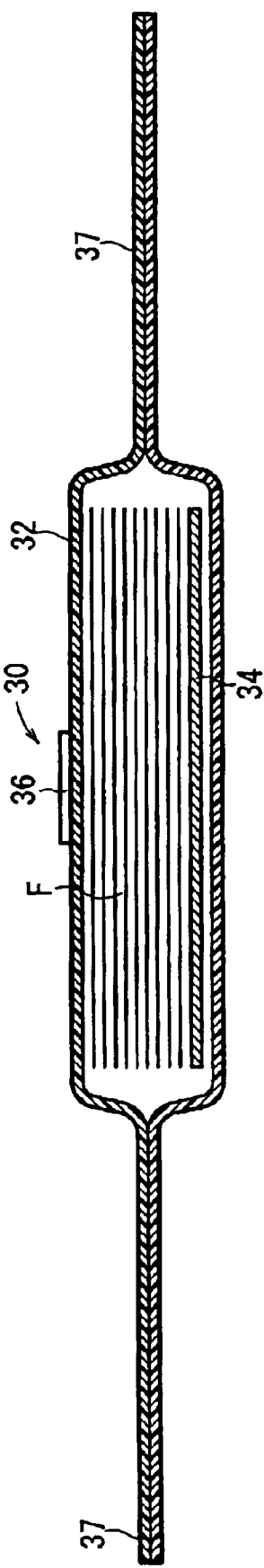
FIG. 2 is a cross-sectional view of a package of stacked photosensitive mediums.
Figure 3:
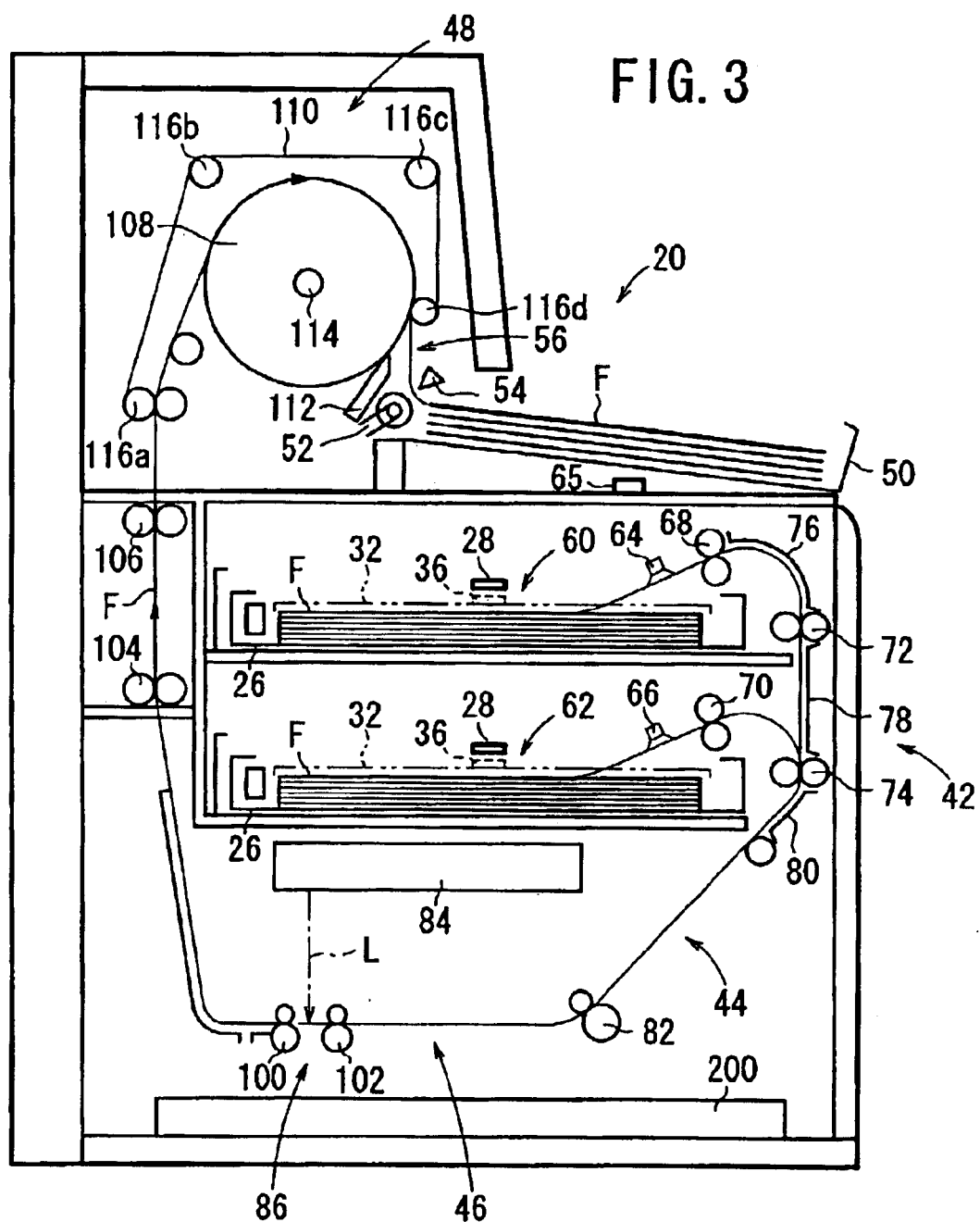
FIG. 3 is a schematic vertical cross-sectional view of an image forming apparatus.

FIG. 2 shows a package 30 of photosensitive mediums F in cross section. FIG. 3 shows in schematic cross section one of the image forming apparatus 20 for producing a print (hard copy) recording thereon a visible image representative of image data supplied from the CR apparatus 14 or the like which is one of the medical imaging apparatus 19 and also serves as an image data supply source.

As shown in FIG. 2, the package 30 comprise a packaging pouch 32 made of a pliable material, a plurality of (e.g., 100) stacked photosensitive mediums F accommodated in the packaging pouch 32, and a backing corrugated cardboard sheet 34 accommodated in the packaging pouch 32 and held against the photosensitive mediums F for protecting the photosensitive mediums F. The packaging pouch 32 has left and right ends 37 each comprising upper and lower layers of the packaging pouch 32 which are bonded to each other. The upper and lower layers of the left and right ends 37 are bonded to such an extent that they can be peeled off by manual forces.

A bar-code seal 36 is applied to a surface of the packaging pouch 32. The bar-code seal 36 bears a bar code recording attribute information of the production date of the packaging pouch 32, the name of the manufacturer of the packaging pouch 32, the production lot number of the photosensitive mediums F housed in the packaging pouch 32, the trade name of the photosensitive mediums F, the trade name code of the photosensitive mediums F, and the size of the photosensitive mediums F such as A3, B4, A4, etc. The production lot number of the photosensitive mediums F represents the production lot number of the emulsion applied to the support sheets of the photosensitive mediums F. A large support sheet is coated with an emulsion of a certain production lot number, and then cut into a plurality of photosensitive mediums F having a size of A3, B4, A4, etc. The photosensitive mediums F are then stacked and placed in a packaging pouch 32, thus producing a package 30. The characteristics of the photosensitive mediums F, i.e., the density characteristics thereof, are determined by the characteristics of the emulsion.

Packages 30 are placed in respective trays 26 in the loaders 60, 62 with one of the bonded left and right ends 37 being directed away from the viewer of FIG. 3. After the packages 30 are placed in the trays 26, the attribute information recorded in the bar code on the bar-code seals 36 on the packaging pouches 32 is read by bar-code readers 28 as attribute information readers. The read attribute information is associated with the loaders 60, 62 of the trays 26 in which the packages 30 are placed, and then stored in a loader-associated attribute information storage unit 39 of a memory 38. Thus, the loader-associated attribute information storage unit 39 stores the attribute information of the photosensitive mediums F loaded in the loaders 60, 62 in association with the loaders 60, 62 of the image forming apparatus 20.

The attribute information of the photosensitive mediums F associated with the loaders 60, 62 and the image forming apparatus 20 and the characteristics of the photosensitive mediums F are stored in the database 40 of the workstation 24.

The image forming apparatus 20 has a selector 65 for selecting the size of photosensitive mediums F on which the user is to form images.

As shown in FIG. 3, the image forming apparatus 20 basically has a photosensitive medium supply unit 42, a transversely shifting unit 44, an image exposure unit 46, a thermal development unit 48, and a discharge tray 50 which are successively arranged in the feeding direction in which photosensitive mediums F are fed. As shown in FIG. 1, the image exposure unit 46 and the thermal development unit 48 jointly make up an image forming assembly 45.

As shown in FIG. 3, a density measuring unit 56 is disposed between the thermal development unit 48 and the discharge tray 50. The density measuring unit 56 comprises a light source 52 and a line sensor 54 for measuring the density characteristics of a photosensitive medium F after the latent image thereon has been thermally developed.

Although not shown in FIG. 3, the image forming apparatus 20 includes various feed rollers and guides for feeding photosensitive mediums F and various sensors in addition to the illustrated components. These feed rollers, guides, and sensors jointly make up a feed system 58 (see FIG. 1).

Usually, 100 photosensitive mediums F are stacked and pouched into a package 30, and such packages 30 are placed in the respective trays 26 of the loaders 60, 62.

After the attribute information recorded in the bar code on the bar-code seals 36 on the packaging pouches 32 is read by the respective bar-code readers 28, the packaging pouches 32 are pulled out, leaving the stacked photosensitive mediums F in the trays 26. The stacked photosensitive mediums F can now be removed one at a time from the trays 26 for forming images thereon.

The photosensitive medium supply unit 42 is positioned to remove the photosensitive mediums F one at a time from the trays 26 of the loaders 60, 62 and supply them to the transversely shifting unit 44 which is positioned downstream of the photosensitive medium supply unit 42 with respect to the feeding direction in which the photosensitive mediums F are fed. The photosensitive medium supply unit 42 comprises the loaders 60, 62, a sheet feeding means comprising suction cups 64, 66 disposed in the loaders 60, 62, supply roller pairs 68, 70, feed roller pairs 72, 74, and feed guides 76, 78, 80.

As described above, the image forming apparatus 20 has the two loaders 60, 62. The trays of the loaders 60, 62 accommodate therein photosensitive mediums F having the same size or different sizes (e.g., A3 for X-ray CT apparatus 16 and the MRI apparatus 18 and B4 for the CR apparatus 14).

The sheet feeding means in the loaders 60, 62 operates by attracting photosensitive mediums F with the suction cups 64, 66, moving the suction cups 64, 66 with a known moving means such as a link mechanism or the like to feed the photosensitive mediums F, and supplying the photosensitive mediums F to the supply roller pairs 68, 70 in the respective loaders 60, 62.

The photosensitive medium F supplied to the supply roller pair 68 is guided by the feed guides 76, 78, 80 and fed by the feed roller pairs 72, 74 to the transversely shifting unit 44 which is positioned downstream of the photosensitive medium supply unit 42. The photosensitive medium F supplied to the supply roller pair 70 is guided by the feed guides 78, 80 and fed by the feed roller pair 74 to the transversely shifting unit 44 which is positioned downstream of the photosensitive medium supply unit 42.

The transversely shifting unit 44 positions the photosensitive medium F in a direction (hereinafter referred to as "transverse direction") perpendicular to the feeding direction for thereby positioning, i.e., registering sideways, the photosensitive medium F in a main scanning direction in the image exposure unit 46 which is positioned downstream of the transversely shifting unit 44. The transversely shifting unit 44 then feeds the photosensitive medium F to the image exposure unit 46 with a feed roller pair 82.

The image exposure unit 46 applies a light beam L to the photosensitive medium F while deflecting the light beam L in the main scanning direction, thereby exposing the photosensitive medium F to the light beam L. The image exposure unit 46 comprises an exposure unit 84 and an auxiliary scanning feed means 86.

Figure 4:
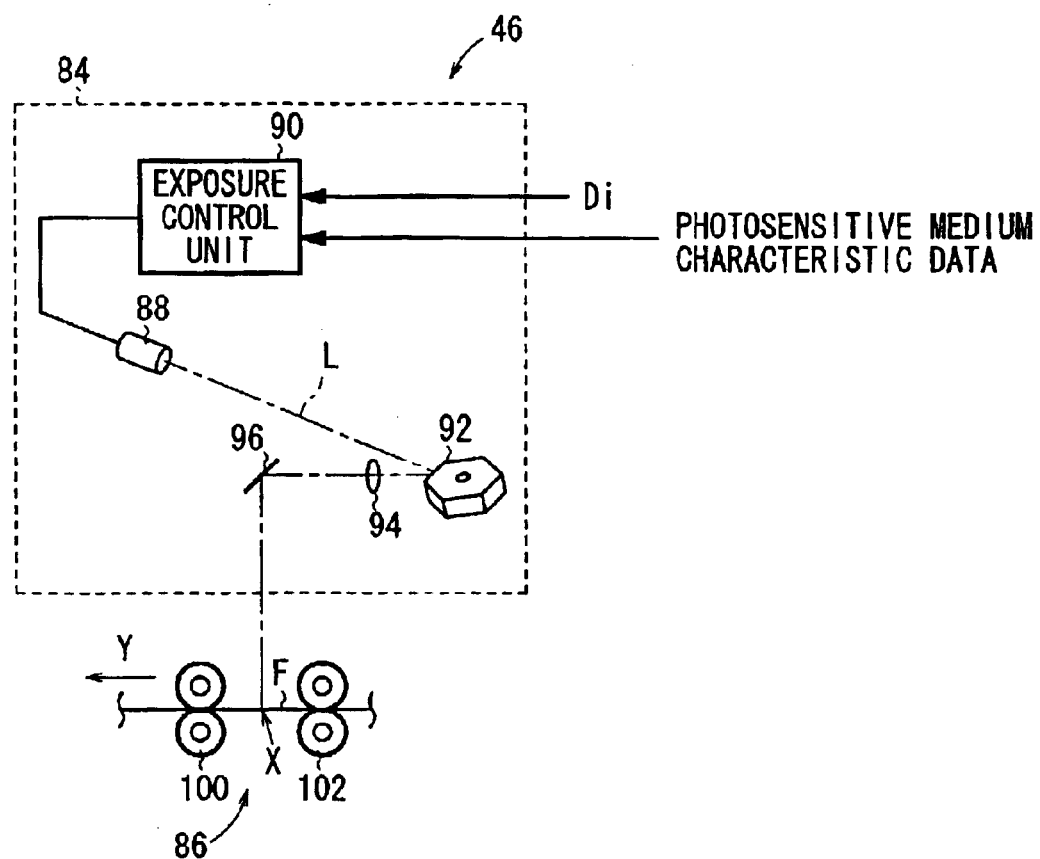
FIG. 4 is a schematic view of an image exposure unit.

FIG. 4 schematically shows the image exposure unit 46. In the image exposure unit 46, the exposure unit 84 comprises a known light beam scanning device which deflects the light beam L which has been modulated by an image to be recorded, in the main scanning direction (normal to the sheets of FIGS. 3 and 4) and applies the light beam L to a recording position X on the photosensitive medium F. The exposure unit 84 comprises a light source 88, an exposure control unit 90 for energizing the light source 88, a polygon mirror 92 serving as a light deflector, an fθ lens 94, and a downwardly reflecting mirror 96.

The light source 88 emits the light beam L in a narrow wavelength range depending on the spectral sensitivity of the photosensitive medium F. Image data Di supplied from the image data supply source such as the CR apparatus 14 via the local area network 12 to the image forming apparatus 20 is sent to the exposure control unit 90 in the image exposure unit 46. The exposure control unit 90 is also supplied with data representing the density characteristics of the photosensitive medium F from the memory 38.

The exposure control unit 90 corrects standard exposure conditions with the data representing the density characteristics of the photosensitive medium F, and converts the supplied image data Di into a drive signal for the light source 88 according to the corrected standard exposure conditions. The light source 88 emits the modulated light beam L in response to the drive signal.

For forming a test pattern image such as a gradation image or the like, the exposure control unit 90 converts image data Di for generating a test pattern image which is stored in the memory 38 into a drive signal for the light source 88 according to the standard exposure conditions.

The light beam L modulated by the drive signal and emitted from the light source 88 is deflected in the main scanning direction by the polygon mirror 92, adjusted by the fθ lens 94 so as to be focused in the recording position X, and directed by the downwardly reflecting mirror 96 toward the recording position X.

The auxiliary scanning feed means 86 has a pair of feed roller pairs 100, 102 positioned one on each side of the recording position X (scanning line). The feed roller pairs 100, 102 hold the photosensitive medium F in the recording position X and feeds the photosensitive medium F in an auxiliary scanning direction (indicated by the arrow Y in FIG. 4) which is perpendicular to the main scanning direction. Since the light beam L modulated by the image to be recorded is deflected in the main scanning direction, the photosensitive medium F is two-dimensionally scanned by and exposed to the light beam L, and records a latent image thereon based on the image data Di represented by the light beam L.

As shown in FIG. 3, the photosensitive medium F with the latent image recorded thereon by the image exposure unit 46 is fed to the thermal development unit 48 by feed roller pairs 104, 106. The thermal development unit 48 heats the photosensitive medium F under development conditions corrected by the characteristics of the photosensitive medium F, thus thermally developing the latent image into a visible image. The thermal development unit 48 comprises a heating drum 108, an endless belt 110 held against the heating drum 108, and a peeling finger 112.

The heating drum 108 houses therein a heating light source such as a halogen lamp or a heat source such as a heater and has its circumferential surface heated to and held at a temperature depending on the thermal development temperature of the photosensitive medium F. The heating drum 108 rotates about a shaft 114 and feeds the photosensitive medium F that is sandwiched between the outer circumferential surface of the heating drum 108 and the endless belt 110. The endless belt 110 is trained around four rollers 116a, 116b, 116c, 116d, and also around a substantially half portion of the full outer circumferential surface of the heating drum 108. The endless belt 110 is pressed by the heating drum 108.

The peeling finger 112 serves to peel the photosensitive medium F off the heating drum 108. The peeling finger 112 is lightly held in abutment against the heating drum 108 as it rotates to feed the photosensitive medium F.

The photosensitive medium F as it is introduced into the thermal development unit 48 by the feed roller pair 106 is gripped between and fed by the endless belt 110 and the feed roller pairs 104, 106, and enters between the heating drum 108 and the endless belt 110. Then, the photosensitive medium F is fed in response to rotation of the heating drum 108. While the photosensitive medium F is being fed by the heating drum 108, the latent image recorded on the photosensitive medium F is thermally developed into a visible image by the heating drum 108.

When the leading end of the photosensitive medium F approaches the peeling finger 112, the peeling finger 112 is brought from a position spaced from the heating drum 108 into light abutment against the heating drum 108, and is wedged between the heating drum 108 and the photosensitive medium F, thereby peeling the photosensitive medium F off the heating drum 108.

The temperature of the heating drum 108 is kept in a temperature range from 85° C. to 150° C. depending on the characteristics of the photosensitive medium F. The temperature of the heating drum 108 may be varied based on a thermal development time which may be adjusted by either changing the speed at which the photosensitive medium F is fed depending on the density characteristics of the photosensitive medium F or stopping feeding the photosensitive medium F after the photosensitive medium F is completely placed in the thermal development unit 48. The thermal development time may be kept in a range from 10 seconds to 90 seconds.

After the latent image on the photosensitive medium F is thermally developed by the heating drum 108, the photosensitive medium F is peeled off the heating drum 108 by the peeling finger 112, and then discharged out of the image forming apparatus into the discharge tray 50. The light source 52 and the line sensor 54 of the density measuring unit 56 are disposed between the thermal development unit 48 and the discharge tray 50. The light source 52 and the line sensor 54 are positioned one on each side of the path along which the photosensitive medium F is fed. The line sensor 54 serves to measure the amount of light emitted from the light source 52 and transmitted through the photosensitive medium F at a plurality of spots along the main scanning direction. Since the photosensitive medium F includes the transparent support sheet, the density characteristics of the photosensitive medium F can be measured when the amount of light emitted from the light source 52 and transmitted through the photosensitive medium F is measured by the line sensor 54.

However, the measurement of the density characteristics of the thermally developed image formed on the photosensitive medium F is not limited to the above process, but may be carried out by any of various known density measuring means. For example, if the photosensitive medium F is made of a material which is not transparent, then the density of the thermally developed image formed on the photosensitive medium F may be measured by detecting light reflected by the photosensitive medium F. Alternatively, the density of the thermally developed image formed on the photosensitive medium F may be measured by any of various densitometers.

As shown in FIG. 1, the image forming apparatus 20 has a control apparatus 200 for controlling the image forming apparatus 20 in its entirety. The control apparatus 200 comprises a controller 202 in the form of a CPU (Central Processing Unit), the memory 38 having a ROM (Read Only Memory), a RAM (Random Access Memory), and an EEPROM (Electrically Erasable Programmable ROM), and including the loader-associated attribute information storage unit 39 which comprises a portion of the storage area of the EEPROM, and a communication interface (I/F) 204 for communicating with the other image forming apparatus 20, the CR apparatus 14, the X-ray CT apparatus 16, the MRI apparatus 18, and the workstation 24 via the local area network 12. In the present embodiment, the loader-associated attribute information storage unit 39 may comprise a portion of the storage area of the volatile RAM.

The medical imaging system 10 according to the present embodiment is basically constructed and operates as described above.

An operation sequence of the medical imaging system 10 shown in FIG. 1 for sharing photosensitive medium characteristics will be described below with reference to FIG. 5.

Figure 5:
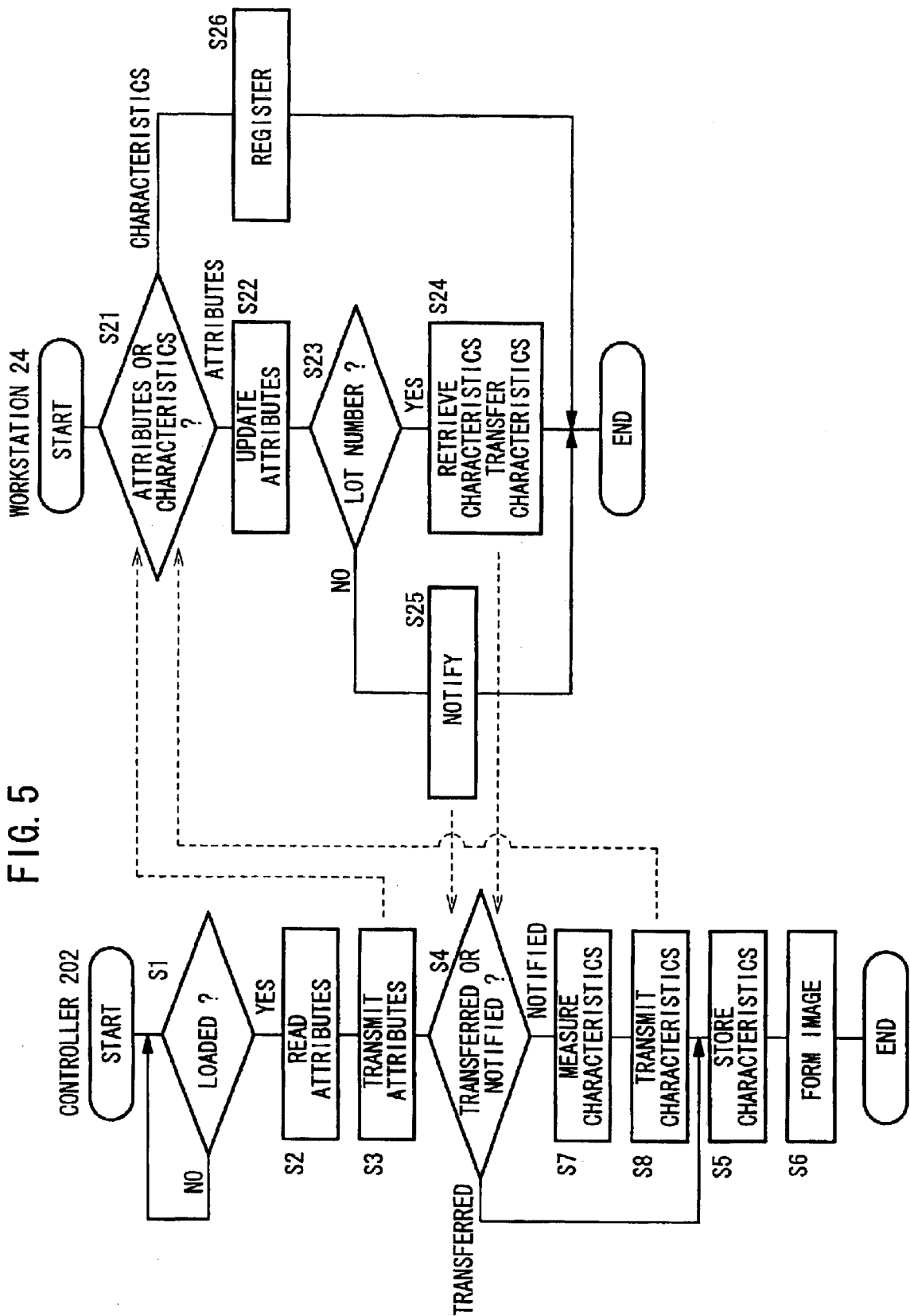
FIG. 5 is a flowchart of an operation sequence of the medical imaging system shown in FIG. 1.

In step S1 shown in FIG. 5, the controller 202 of each image forming apparatus 20 monitors whether new photosensitive mediums F have been loaded in a tray 26 or not.

When a package 30 of photosensitive mediums F is loaded, the package 30 is set on the tray 26 of the loader 60 or 62. The bar-code reader 28 reads the bar code on the bar-code seal 36 on the package 30, enabling the controller 202 to confirm the loading of the photosensitive mediums F.

In step S2, the controller 202 reads from the output signal from the bar-code reader 28 the attribute information of the new photosensitive mediums F which is recorded in the bar code, i.e., the production date of the photosensitive mediums F, the name of the manufacturer of the photosensitive mediums F, the production lot number of the emulsion of the photosensitive mediums F, the trade name of the photosensitive mediums F, the trade name code of the photosensitive mediums F, and the size of the photosensitive mediums F. Thereafter, the packaging pouch 32 is removed, and the photosensitive mediums F are loaded in the loader 60 or 62 and ready for being supplied to the photosensitive medium supply unit 42.

The attribute information of the photosensitive mediums F loaded in the loaders 60, 62 is associated with the loaders 60, 62 and stored in the loader-associated attribute information storage unit 39.

Minimum information required among the attribute information is the emulsion production lot number which determines the characteristics of the photosensitive mediums F.

In step S3, the controller 202 reads the stored attribute information of the new photosensitive mediums F from the loader-associated attribute information storage unit 39, and transmits the attribute information, together with an identification code of the image forming apparatus, e.g., a production number thereof, and the position of the loader 60 or 62 which is loaded with the new photosensitive mediums F, to the workstation 24 via the communication interface 204 and the local area network 12.

In step S21, the workstation 24 monitors at all times whether attribute information, etc. is transmitted from the image forming apparatus 20.

Figure 6:
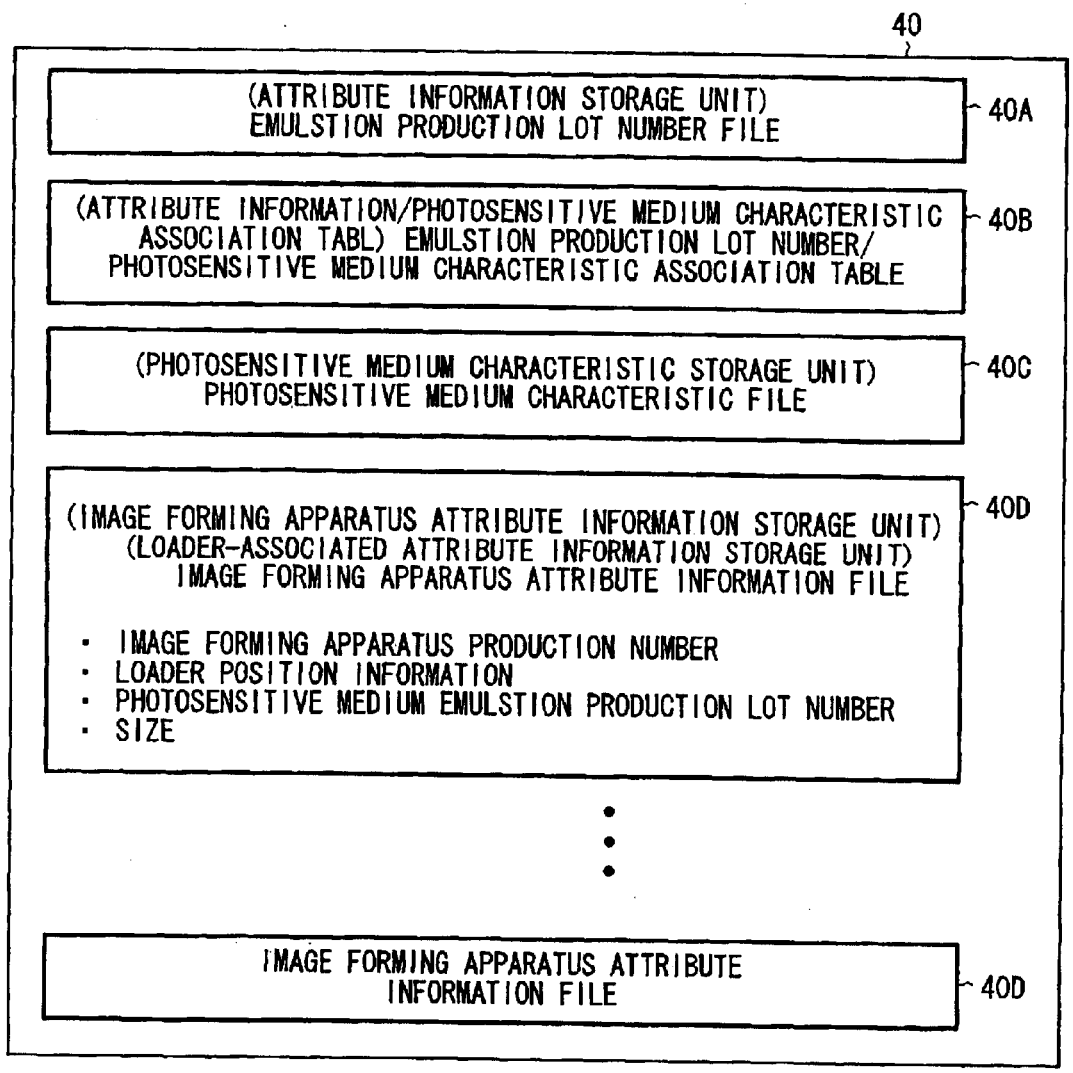
FIG. 6 is a diagram showing file data contained in a database in the medical imaging system shown in FIG. 1.

FIG. 6 shows file data contained in the database 40 in the workstation 24.

As shown in FIG. 6, the database 40 has an emulsion production lot number file 40A as an attribute information storage unit, an emulsion production lot number/ photosensitive medium characteristic association table (attribute information/photosensitive medium characteristic association table) 40B as an attribute information/ photosensitive medium characteristic association table, a photosensitive medium characteristic file 40C as a photosensitive medium characteristic storage unit, and an image forming apparatus attribute information file 40D as an image forming apparatus attribute information storage unit or loader-associated attribute information storage unit.

If the workstation 24 receives the attribute information from the image forming apparatus 20 in step S21, then the workstation 24 updates the data of the image forming apparatus attribute information file 40D. The database 40 has as many image forming apparatus attribute information files 40D as the number of all loaders 60, 62 in the image forming apparatus 20 that are connected to the local area network 12. Since two image forming apparatus 20 are connected to the local area network 12 in the medical imaging system 10 shown in FIG. 1, the database 40 has four image forming apparatus attribute information files 40D. These four image forming apparatus attribute information files 40D are identified by the identification codes (production numbers) of the image forming apparatus 20 and the positional information of the loaders 60, 62 in the image forming apparatus 20. For example, the positional information of the loaders 60, 62 may be represented by "1" for the upper loader 60 and "0" for the lower loader 62. While the positions of two loaders may be represented by 1-bit information, the positions of three or more loaders may be represented by information of 2 or more bits. Of the data of the image forming apparatus attribute information file 40D, the size represents the size of the photosensitive mediums F. If the image forming apparatus 20 has three or more loaders, the photosensitive mediums F loaded in those loaders may have different sizes, e.g., A3, B4, A4, or may have the same size.

Thus, the workstation 24 identifies one of the image forming apparatus attribute information files 40D based on the production number of the image forming apparatus 20 and the positional information of the loader 60 or 62 among the attribute information received in step S21. The workstation 24 updates the emulsion production load number of the photosensitive mediums F in the identified image forming apparatus attribute information file 40D into the transmitted emulsion production load number, and also updates the size of the photosensitive mediums F in the identified image forming apparatus attribute information file 40D. When the file data are thus updated, the old file data remain stored as chronological data.

By referring to the image forming apparatus attribute information file 40D, the chronological data of the corresponding image forming apparatus 20 can be confirmed.

Then, in step S23, the workstation 24 refers to the emulsion production lot number among the received attribute information, and determines whether the same emulsion production lot number is contained in the emulsion production lot number file 40A or not.

If the same emulsion production lot number is contained in the emulsion production lot number file 40A, then the workstation 24 refers to the emulsion production lot number/ photosensitive medium characteristic association table 40B and extracts data name of the photosensitive medium characteristics corresponding to the emulsion production lot number in step S24. The workstation 24 also refers to the photosensitive medium characteristic file 40C, extracts photosensitive medium characteristic data corresponding to the extracted data name of the photosensitive medium characteristics, and transfers the extracted photosensitive medium characteristic data via the local area network 12 to the image forming apparatus 20 which has transmitted the attribute information.

The controller 202, which has transmitted the attribute information in step S3, confirms whether photosensitive medium characteristic data have been transferred or it has been notified of non-storage of the photosensitive medium characteristic data in step S4.

If photosensitive medium characteristic data have been transferred, then the controller 202 stores the transferred photosensitive medium characteristic data in the memory 38 in step S5.

In this manner, the photosensitive medium characteristic data of the new photosensitive mediums F loaded in the loader 60 or 62 are transmitted from the database 40 in the workstation 24 and stored in the memory 38 of the image forming apparatus 20.

Based on the photosensitive medium characteristic data, the exposure control unit 90 in the image exposure unit 46 corrects the standard exposure conditions into exposure conditions that match the characteristics of the photosensitive mediums F newly loaded in the loader 60 or 62. Based on the photosensitive medium characteristic data, the image forming apparatus also corrects the standard thermal development conditions in the thermal development unit 48 into thermal development conditions that match the characteristics of the new photosensitive mediums F.

In step S6, when image data Di are sent from the CR apparatus 14 or the like to the image forming apparatus 20, the controller 202 controls the image forming assembly 45 to expose a photosensitive medium F to the light beam L modulated by the image data Di to form a latent image thereon and thermally develop the latent image into a visible image under image forming conditions (i.e., exposure and thermal development conditions) depending on the characteristics of the new photosensitive mediums F. If the emulsion production lot number file 40A in the database 40 does not contain the emulsion production lot number among the received attribute information in step S23, then the workstation 24 notifies the image forming apparatus 20 which has transmitted the attribute information, via the local area network 12, of non-storage of the photosensitive medium characteristic data corresponding to the emulsion production lot number in step S25.

The controller 202, which is notified of non-storage of the photosensitive medium characteristic data in step S4, controls the feed system 58 to feed a loaded new photosensitive medium F to the image exposure unit 46, and controls the image exposure unit 46 to expose the photosensitive medium F to a light beam L representing a test pattern under the standard image forming conditions (exposure conditions) to form a test pattern latent image thereon.

The photosensitive medium F with the test pattern latent image formed thereon is then fed by the feed system 58 to the thermal development unit 48, which thermally develops the test pattern latent image into a visible test pattern image under the standard image forming conditions (thermal development conditions).

The visible test pattern image on the photosensitive medium F is then sent to the density measuring unit 56, which measures density characteristics of the test pattern image. The characteristics of the photosensitive medium F which are represented by the measured density characteristics, i.e., the density characteristics themselves or, if standard density characteristics under the standard image forming conditions are stored in the memory 38, the characteristics of the difference or ratio between the measured density characteristics and the standard density characteristics, are used as the characteristic data of the new photosensitive mediums F.

The photosensitive medium characteristic data are then transmitted, along with the attribute information including the emulsion lot number of the photosensitive mediums F, the identification code of the image forming apparatus 20, and the positional information of the loader 60 or 62 which has been loaded with the new photosensitive mediums F, from the controller 202 via the local area network 12 to the workstation 24.

The workstation 24, which has received the new photosensitive medium characteristic data in step S21, registers the received photosensitive medium characteristic data as new file data in the photosensitive medium characteristic file 40C and updates the emulsion production lot number/photosensitive medium characteristic association table 40B in step S26.

In step S5, the image forming apparatus 20 stores the characteristics of the photosensitive mediums F in the memory 38.

In step S6, an image is formed under new image forming conditions based on the characteristics of the new photosensitive mediums F.

Figure 7:
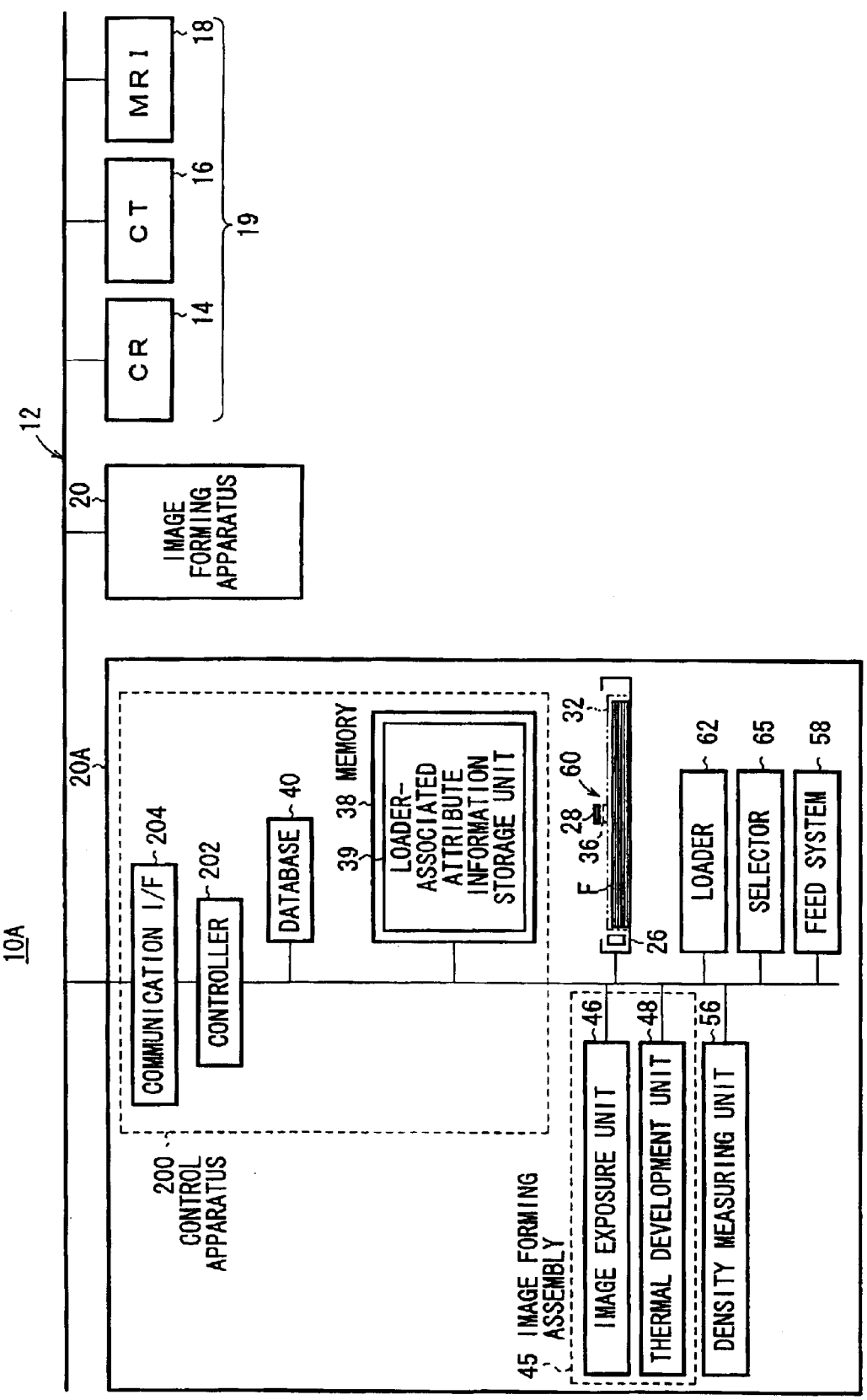
FIG. 7 is a block diagram of a medical imaging system according to another embodiment of the present invention.

In the medical imaging system 10 shown in FIG. 1, a characteristics storage and retrieval apparatus having the database 40 is implemented by the workstation 24. However, according to another embodiment shown in FIG. 7, the database 40 is incorporated in one 20A of the plural image forming apparatus 20, or specifically, connected to the controller 202 in the image forming apparatus 20A.

There is thus constructed a medical imaging system 10A as a system for sharing photosensitive medium characteristics where the image forming apparatus 20A with the database 40 incorporated therein doubles as a characteristics storage and retrieval apparatus. The medical imaging system 10A does not require the workstation 24.

According to the embodiment, as described in detail above, each image forming apparatus 20 is loaded with photosensitive mediums F, and the photosensitive mediums F are exposed to image light to form latent images thereon and the latent images are developed into visible images under image forming conditions depending on the density characteristics of the photosensitive mediums F. The workstation 24 stores the density characteristics in the database 40 in association with the emulsion production lot numbers as attribute information of the photosensitive mediums F in order to share the density characteristics of the photosensitive mediums F accommodated in the plural image forming apparatus 20.

Since the workstation 24 having the database 40 which stores the density characteristics of the photosensitive mediums F in association with the attribute information of the photosensitive mediums F is connected to the local area network 12 to which the plural image forming apparatus 20 are connected, when new photosensitive mediums F are loaded in the loaders 60, 62 of a certain image forming apparatus 20, the attribute information of the new photosensitive mediums F is sent to the workstation 24.

When the density characteristics of the photosensitive mediums F depending on their attribute information are stored in the database 40, the stored density characteristics of the photosensitive mediums F can be downloaded via the local area network 12 into the memory 38 of the certain image forming apparatus 20 for thereby sharing the density characteristics of the photosensitive mediums F.

Therefore, if the density characteristics of new photosensitive mediums F have been stored in the database 40, then any photosensitive medium F to be consumed for a trial print is not required. The preparatory time which is required for the image forming apparatus 20 to be able to form images when new photosensitive mediums F are loaded in the image forming apparatus 20 is minimized. Even if the amount of data of the density characteristics of new photosensitive mediums F is large, because the data are not read from a bar code, but downloaded from the database 40, the large characteristic data of the photosensitive mediums F can be obtained with ease.

In the present embodiment, each image forming apparatus 20 itself has the density measuring unit 56 for measuring the density of an image formed on a photosensitive medium F. When new photosensitive mediums F are loaded into the image forming apparatus 20 and attribute information of the photosensitive mediums F has not been stored in the database 40, the image forming apparatus 20 can produce a test pattern image and measure the density of the test pattern image with the density measuring unit 56.

The workstation 24 stores received new density characteristics in the database 40 in association with the new attribute information of the new photosensitive mediums F. Consequently, when photosensitive mediums F having the same attribute information are newly loaded into another image forming apparatus 20, the new photosensitive mediums F are not required to be measured for density characteristics based on a trial print, but those new photosensitive mediums F can be used immediately.

In the above embodiment, when photosensitive mediums F are newly loaded into one of the image forming apparatus 20, the attribute information of the photosensitive mediums F is transmitted from the one image forming apparatus 20 via the local area network 12 to the workstation 24 having the database 40 (step S3), the workstation 24 which has received the attribute information determines whether the received attribute information is stored or not and, if the received attribute information is stored, extracts the density characteristics corresponding to the attribute information, and transmits the extracted density characteristics to the one image forming apparatus 20 (step S24), and the one image forming apparatus 20 exposes a photosensitive medium F to image light to form a latent image and develops the latent image into a visible image under image forming conditions depending on the received density characteristics (step S6).

With the above arrangement, inasmuch as the density characteristics of the photosensitive mediums F depending on the attribute information can be shared by the plural image forming apparatus 20 connected to the local area network 12, the number of any photosensitive mediums F to be consumed for a trial print is minimized, and the preparatory time which is required for the image forming apparatus 20 to be able to form images when new photosensitive mediums F are loaded in the image forming apparatus 20 is minimized. In addition, the characteristics of the photosensitive mediums F can be acquired with ease even if the amount of data of the density characteristics of the photosensitive mediums F is large.

Figure 8:
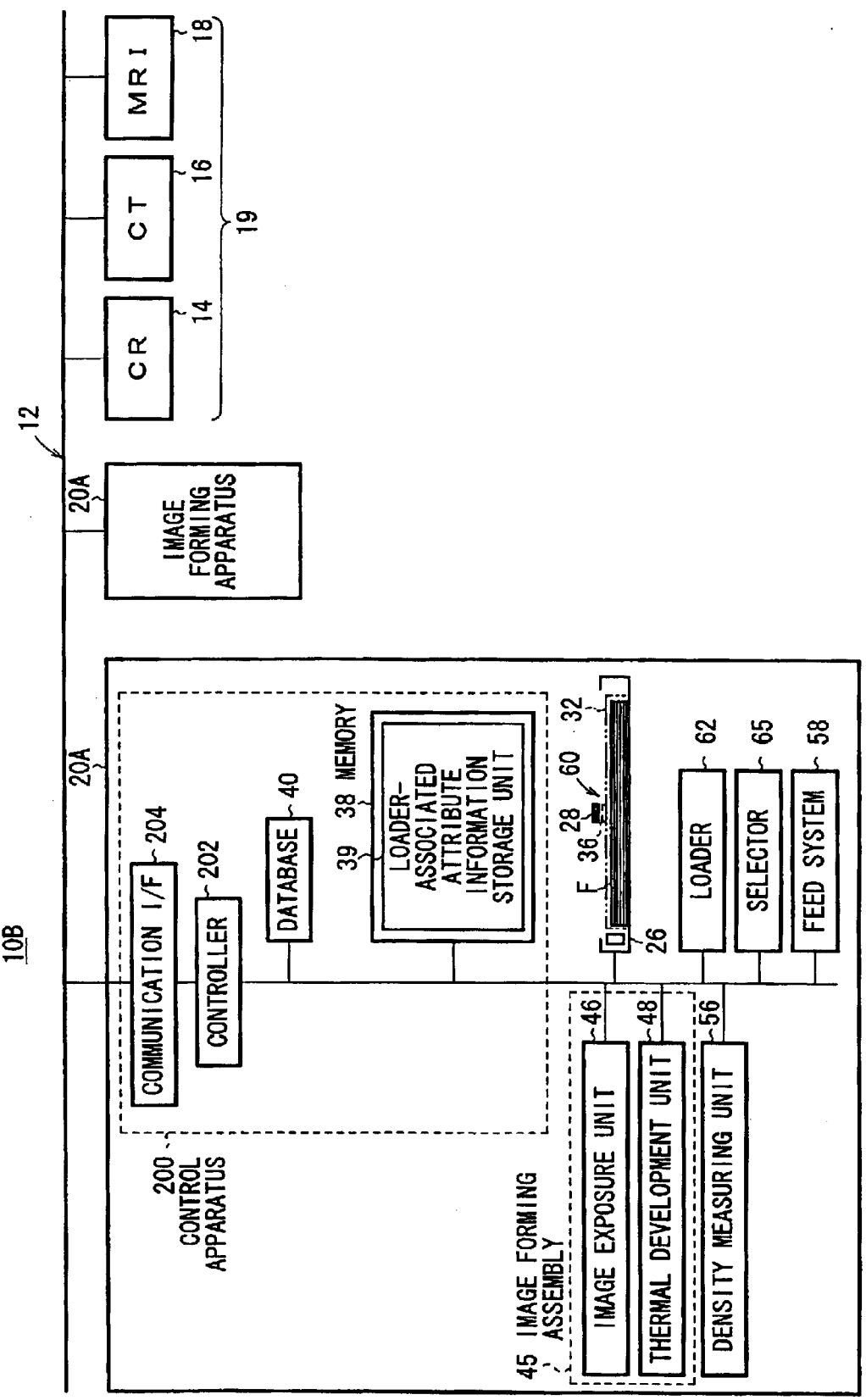
FIG. 8 is a block diagram of a medical imaging system according to still another embodiment of the present invention.

FIG. 8 shows in block form a medical imaging system 10B according to still another embodiment of the present invention. In the medical imaging system 10B, the database 40 is incorporated in each of all image forming apparatus 20A connected to the local area network 12.

Each of the image forming apparatus 20A basically comprises loaders 60, 62 for being loaded with photosensitive mediums F, bar-code readers 28 as attribute information readers for reading attribute information of photosensitive mediums F when the photosensitive mediums F are loaded into the loaders 60, 62, an image forming assembly 45 for exposing photosensitive mediums F to image light to form a latent image thereon and developing the latent image into a visible image under image forming conditions depending on the density characteristics of the photosensitive mediums F, a density measuring unit 56 for measuring the density characteristics of images formed on photosensitive mediums F, and a database 40. The image forming apparatus 20A are incorporated in a medical facility.

The medical imaging system 10B shares the characteristics of the photosensitive mediums F according to the following sequence:

When photosensitive mediums F are newly loaded into one of the image forming apparatus 20A, the one image forming apparatus 20A determines whether the attribute information read by the bar-code reader 28 is stored in the emulsion production lot number file 40A as the attribute information storage unit or not.

If the attribute information is not stored in the emulsion production lot number file 40A, the image forming assembly 45 exposes a photosensitive medium F to test pattern image light to form a latent image thereon and develop the latent image into a visible test pattern image under the standard image forming conditions.

The density measuring unit 56 then measures the density characteristics of the test pattern image.

Then, the data of the database 40 in the one image forming apparatus 20A are updated with the attribute information and the density characteristics of the newly loaded photosensitive mediums F, and the data of the databases 40 in the other image forming apparatus 20A are updated into the same data contained in the database 40 in the one image forming apparatus 20A.

With the medical imaging system 10B shown in FIG. 8, when the data in the database in one of the image forming apparatus 20A are updated, the data in the databases 40 in all the remaining image forming apparatus 20A connected to the local area network 12 are automatically updated into the same data contained in the database 40 in the one image forming apparatus 20A. Therefore, even when one of the image forming apparatus 20A fails to operate, the database 40 in another image forming apparatus 20A can be used as a backup to avoid a system malfunction due to the failure. The medical imaging system 10B is thus highly reliable in operation.

Figure 9:
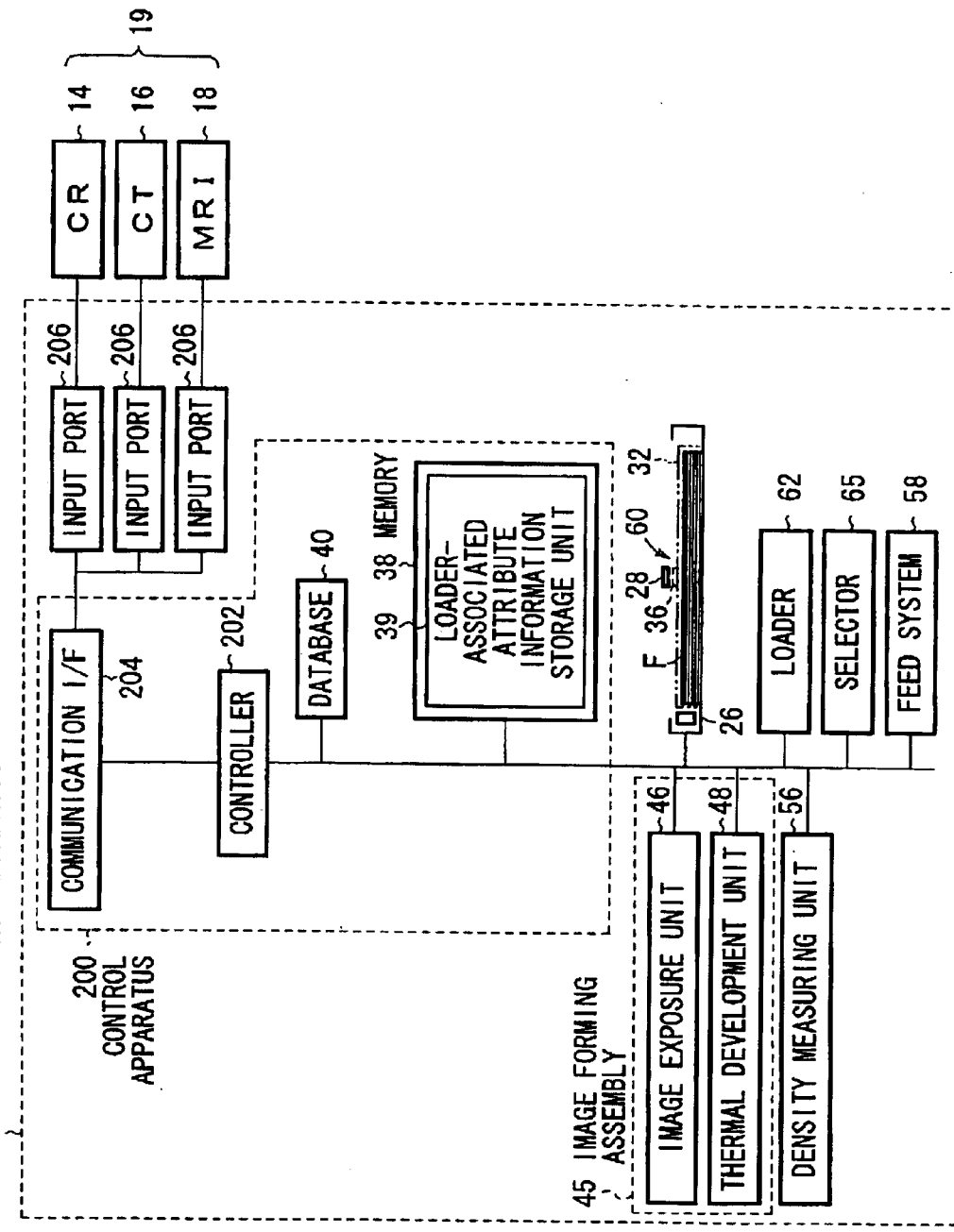
FIG. 9 is a block diagram of a medical imaging system according to yet another embodiment of the present invention, which employs a standalone image forming apparatus.

FIG. 9 shows in block form a medical imaging system 10C according to yet another embodiment of the present invention. The medical imaging system 10C comprises a standalone image forming apparatus 20B and a plurality of medical imaging apparatus 19 including a CR apparatus 14, an X-ray CT apparatus 16, and an MRI apparatus 18 which are connected to respective input ports 206 of the image forming apparatus 20B.

Data of an image which is captured of a subject by any one of the medical imaging apparatus 19 are supplied to the image forming apparatus 20B, which produces a visible image on a photosensitive medium F.

The image forming apparatus 20B is basically identical in structure to the image forming apparatus 20A which has the database 40.

Specifically, the image forming apparatus 20B basically comprises loaders 60, 62 for being loaded with respective packages of photosensitive mediums F, bar-code readers 28 as attribute information readers for reading attribute information of photosensitive mediums F when the photosensitive mediums F are loaded into the loaders 60, 62, an image forming assembly 45 for exposing photosensitive mediums F to image light to form a latent image thereon and developing the latent image into a visible image under image forming conditions depending on the density characteristics of the photosensitive mediums F, a density measuring unit 56 for measuring the density characteristics of images formed on photosensitive mediums F, and a database 40.

In the image forming apparatus 20B, the photosensitive mediums F loaded in the loaders 60, 62 may have different characteristics and different sizes.

As described above, the database 40 has an emulsion production lot number file 40A as an attribute information storage unit, an emulsion production lot number/photosensitive medium characteristic association table 40B as an attribute information/photosensitive medium characteristic association table, a photosensitive medium characteristic file 40C as a photosensitive medium characteristic storage unit, and an image forming apparatus attribute information file 40D as an image forming apparatus attribute information storage unit or loader-associated attribute information storage unit.

With the medical imaging system 10C shown in FIG. 9, when photosensitive mediums F are newly loaded into the loader 60 or 62, if the emulsion production lot number represented by the attribute information of the newly loaded photosensitive mediums F which is read by the bar-code reader 28 is stored in the emulsion production lot number file 40A, then the controller 202 controls the density measuring unit 56 not to measure density characteristics, and also controls the image forming assembly 45 to form an image using the density characteristics stored in the photosensitive medium characteristic file 40C.

If the emulsion production lot number of the newly loaded photosensitive mediums F is a new number that is not stored in the emulsion production lot number file 40A, then the controller 202 supplies one of the newly loaded photosensitive mediums F to the image forming assembly 45.

The image forming assembly 45 exposes the supplied photosensitive medium F to test pattern image light to form a latent image thereon and develops the latent image into a visible test pattern image under the standard image forming conditions. The density measuring unit 56 then measures the density characteristics of the test pattern image.

The controller 202 stores the measured density characteristics in the photosensitive medium characteristic file 40C, and updates the file data in the emulsion production lot number file 40A, the image forming apparatus attribute information file 40D, and the emulsion production lot number/photosensitive medium characteristic association table 40B.

With the medical imaging system 10C shown in FIG. 9, the density characteristics can be shared in the image forming apparatus 20B having the loaders 60, 62. When photosensitive mediums F having the same emulsion production lot number are loaded into one of the loaders 60, 62, no trial print is needed and the density characteristics do not need to be measured.

Actually, if the production lot numbers of the emulsions applied to the support sheets of photosensitive mediums F, which are represented by the attribute information of the photosensitive mediums F, are identical to each other, then even when the photosensitive mediums F have different sizes or accommodated in different packages 30, desired images can be produced on the photosensitive mediums F under image forming conditions corresponding the same density characteristics.

If the emulsion production lot number of newly loaded photosensitive mediums F is a new number not stored in the database 40, then a test pattern image is formed on one of the newly loaded photosensitive mediums F, and measured for its density characteristics. The controller 202 stores the measured density characteristics in the database 40, and updates other data in the database 40. With this arrangement, when photosensitive mediums F having the same emulsion production lot number are newly loaded, no trial print is needed and the density characteristics do not need to be measured.

According to the present invention, as described above, since the characteristics of photosensitive mediums are shared between the image forming apparatus connected to the local area network, the number of any photosensitive medium to be consumed for a trial print is minimized, and the preparatory time which is required for the image forming apparatus to be able to form images when new photosensitive mediums are loaded in the image forming apparatus is minimized. Even if the amount of data of the density characteristics of new photosensitive mediums is large, the large characteristic data of the photosensitive mediums can be obtained with ease.

Furthermore, because the characteristics of photosensitive mediums are shared between the loaders in the image forming apparatus, the number of any photosensitive medium to be consumed for a trial print is minimized, and the preparatory time which is required for the image forming apparatus to be able to form images when new photosensitive mediums are loaded in the image forming apparatus is minimized.

Although certain preferred embodiments of the present invention have been shown and described in detail, it should be understood that various changes and modifications may be made therein without departing from the scope of the appended claims.

What is claimed is:

1. A system for sharing characteristics of photosensitive mediums, comprising:

a plurality of image forming apparatus each having a loader for being loaded with photosensitive mediums, attribute information readers for reading attribute information of photosensitive mediums when the photosensitive mediums are loaded into said loader, an image forming assembly for exposing photosensitive mediums to image light to form a latent image thereon and developing the latent image into a visible image under image forming conditions depending on density characteristics of said photosensitive mediums, and a density measuring unit for measuring density characteristics of images formed on said photosensitive mediums; and a characteristics storage and retrieval apparatus connected to said plurality of image forming apparatus by a local area network, for storing the density characteristics of said photosensitive mediums which are measured by the density measuring units of said image forming apparatus in association with said attribute information;

wherein said image forming apparatus share the density characteristics of said photosensitive mediums which are stored in said characteristics storage and retrieval apparatus.

2. A system according to claim 1, wherein when said loader in one of said image forming apparatus is newly loaded with photosensitive mediums, transmitting the attribute information of the newly loaded photosensitive mediums which is read by the corresponding attribute information reader from said one of the image forming apparatus via said local area network to said characteristics storage and retrieval apparatus;

said characteristics storage and retrieval apparatus which has received the transmitted attribute information determines whether the transmitted attribute information is stored therein or not, and if the transmitted attribute information is not stored, said characteristics storage and retrieval apparatus notifies said one of the image forming apparatus of non-storage of the attribute information via said local area network;

when said one of the image forming apparatus is notified of the non-storage of the attribute information, said image forming assembly exposes one of said newly loaded photosensitive mediums to test pattern image light to form a latent image thereon and develops the latent image into a visible test pattern image under standard image forming conditions, and said density measuring unit measures density characteristics of said test pattern image and transmits the measured density characteristics to said characteristics storage and retrieval apparatus; and said characteristics storage and retrieval apparatus stores the transmitted density characteristics in association with the attribute information of the newly loaded photosensitive mediums.

3. A system according to claim 1, wherein said loader in each of said image forming apparatus comprises a plurality of loaders, and said characteristics storage and retrieval apparatus has a loader-associated attribute information storage unit for storing the attribute information of the photosensitive mediums presently loaded in said loaders in association with said loaders.

4. A system according to claim 1, wherein said plurality of image forming apparatus, said characteristics storage and retrieval apparatus, and said local area network are installed in a single medical facility.

5. A system according to claim 1, wherein said characteristics storage and retrieval apparatus is incorporated in at least one of said plurality of image forming apparatus.

6. A system according to claim 1, wherein, when density characteristics in a first image forming apparatus of the plurality of image forming apparatus are updated, density characteristics in the other of the plurality of image forming apparatus are automatically updated.

7. An image forming apparatus comprising:

a plurality of loaders for being loaded with photosensitive mediums;

attribute information readers for reading attribute information of photosensitive mediums when the photosensitive mediums are loaded into said loaders;

an attribute information storage unit for storing said attribute information;

a loader-associated attribute information storage unit for storing the attribute information of the photosensitive mediums presently loaded in said loaders in association with said loaders;

an image forming assembly for exposing photosensitive mediums to image light to form a latent image thereon and developing the latent image into a visible image under image forming conditions depending on density characteristics of said photosensitive mediums:

a density measuring unit for measuring density characteristics of images formed on said photosensitive mediums;

an attribute information/photosensitive medium characteristic association table for associating said attribute information and said density characteristics with each other;

a photosensitive medium characteristics storage unit for storing characteristics of said photosensitive medium; and a controller for, if when photosensitive mediums are newly loaded in one of said loaders, attribute information of the newly loaded photosensitive mediums which is read by one of said attribute information readers is stored in said attribute information storage unit, controlling said density measuring unit not to measure density characteristics and controlling said image forming assembly to form an image using the density characteristics stored in said photosensitive medium characteristics storage unit.

8. An image forming apparatus according to claim 7, wherein if the attribute information of the newly loaded photosensitive mediums is new attribute information not stored in said attribute information storage unit, said controller supplies one of said newly loaded photosensitive mediums to said image forming assembly;

said image forming assembly exposes the supplied photosensitive medium to test pattern image light to form a latent image thereon and develops the latent image into a visible test pattern image under standard image forming conditions;

said density measuring unit measures density characteristics of said test pattern image; and said controller stores the measured density characteristics in said photosensitive medium characteristics storage unit, and updates data stored in said attribute information storage unit, said loader-associated attribute information storage unit, and said attribute information/photosensitive medium characteristic association table.

9. A method of sharing characteristics of photosensitive mediums in a medical imaging facility having a plurality of image forming apparatus each having a loader for being loaded with photosensitive mediums, attribute information readers for reading attribute information of photosensitive mediums when the photosensitive mediums are loaded into said loader, an image forming assembly for exposing photosensitive mediums to image light to form a latent image thereon and developing the latent image into a visible image under image forming conditions depending on density characteristics of said photosensitive mediums, and a density measuring unit for measuring density characteristics of images formed on said photosensitive mediums, a characteristics storage and retrieval apparatus for storing the density characteristics of said photosensitive mediums loaded in the loaders of said plurality of image forming apparatus in association with the attribute information of said photosensitive mediums; and a local area network connected to said plurality of image forming apparatus and said characteristics storage and retrieval apparatus, for allowing each of said image forming apparatus to share said density characteristics stored in said characteristics storage and retrieval apparatus, said method comprising the steps of:

when one of said image forming apparatus is newly loaded with photosensitive mediums, transmitting the attribute information of the newly loaded photosensitive mediums which is read by the corresponding attribute information reader from said one of the image forming apparatus via said local area network to said characteristics storage and retrieval apparatus;

controlling said characteristics storage and retrieval apparatus which has received the transmitted attribute information to determine whether the transmitted attribute information is stored therein or not, and if the transmitted attribute information is stored, controlling said characteristics storage and retrieval apparatus to transmit density characteristics of the attribute information to said one of the image forming apparatus via said local area network; and controlling said image forming assembly of said one of the image forming apparatus to expose one of said newly loaded photosensitive mediums to image light to form a latent image thereon and develop the latent image into a visible image under image forming conditions depending on the transmitted density characteristics.

10. A method according to claim 9, wherein said local area network is installed in a single medical facility.

11. A method of sharing characteristics of photosensitive mediums in a medical imaging facility according to claim 9, wherein, when density characteristics in a first image forming apparatus of the plurality of image forming apparatus are updated, density characteristics in the other of the plurality of image forming apparatus are automatically updated.

12. A method of sharing characteristics of photosensitive mediums in a medical imaging facility having a plurality of image forming apparatus interconnected by a local area network and each having a loader for being loaded with photosensitive mediums, attribute information readers for reading attribute information of photosensitive mediums when the photosensitive mediums are loaded into said loader, an image forming assembly for exposing photosensitive mediums to image light to form a latent image thereon and developing the latent image into a visible image under image forming conditions depending on density characteristics of said photosensitive mediums, a density measuring unit for measuring density characteristics of images formed on said photosensitive mediums, and a database, said database including a storage unit for storing said attribute information, a table for associating said attribute information and the density characteristics of said photosensitive mediums with each other, a photosensitive medium characteristics storage unit for storing the measured density characteristics as characteristics of said photosensitive mediums, and a loader-associated attribute information storage unit for storing the attribute information of the photosensitive mediums presently loaded in said loader of said image forming apparatus, said method comprising the steps of:

when one of said image forming apparatus is newly loaded with photosensitive mediums, determining whether the attribute information read by the corresponding attribute information reader is stored in said attribute information storage unit of said one of the image forming apparatus or not, and if the attribute information is not stored in said attiibute information storage unit, controlling said image forming unit of said one of the image forming apparatus to expose one of the newly loaded photosensitive mediums to test pattern image light to form a latent image thereon and develop the latent image into a visible test pattern image under standard image forming conditions, and controlling the density measuring unit of said one of the image forming apparatus to measure density characteristics of said test pattern image; and updating data of said database of said one of the image forming apparatus with the attribute information of said newly loaded photosensitive mediums and said density characteristics, and updating the databases of the remaining other image forming apparatus into the data of said database of said one of the image forming apparatus through said local area network.

13. A method according to claim 12, wherein said local area network is installed in a single medical facility.

14. A method of sharing characteristics of photosensitive mediums in a medical imaging facility according to claim 12, wherein, when density characteristics in a first image forming apparatus of the plurality of image forming apparatus are updated, density characteristics in the other of the plurality of image forming apparatus are automatically updated.

* * * * *